United States Patent
Bryant et al.

(10) Patent No.: US 11,001,203 B2
(45) Date of Patent: May 11, 2021

(54) PASSENGER SEAT CARGO NET

(71) Applicants: Tanya Gale Bryant, Wildwood, MO (US); Anna Ruth Bryant, St. Louis, MO (US); Sarah Elizabeth Bryant, Richmond Heights, MO (US)

(72) Inventors: Tanya Gale Bryant, Wildwood, MO (US); Anna Ruth Bryant, St. Louis, MO (US); Sarah Elizabeth Bryant, Richmond Heights, MO (US)

(73) Assignee: Tanya Gale Bryant, Clayton, MO (US)

( * ) Notice: Subject to any disclaimer, the term of this patent is extended or adjusted under 35 U.S.C. 154(b) by 196 days.

(21) Appl. No.: 15/952,393

(22) Filed: Apr. 13, 2018

(65) Prior Publication Data

US 2018/0334105 A1   Nov. 22, 2018

Related U.S. Application Data

(60) Provisional application No. 62/603,218, filed on May 22, 2017.

(51) Int. Cl.
*B60R 7/00* (2006.01)
*B60R 7/04* (2006.01)

(52) U.S. Cl.
CPC .............. *B60R 7/005* (2013.01); *B60R 7/043* (2013.01)

(58) Field of Classification Search
CPC .......... B60R 7/043; B60R 7/005; B60R 7/085
USPC ......................................... 297/188.2, 188.21
See application file for complete search history.

(56) References Cited

U.S. PATENT DOCUMENTS

| | | | | |
|---|---|---|---|---|
| 5,354,119 A * | 10/1994 | Nicholas | ................. | B60R 7/043 224/275 |
| 6,145,170 A * | 11/2000 | Bernard | ................. | B60R 7/005 24/116 A |
| 6,182,931 B1 * | 2/2001 | Richard | ............... | B60N 2/6009 108/44 |
| 6,334,562 B1 * | 1/2002 | Ament | .................... | B60R 7/005 224/404 |
| 6,402,000 B1 * | 6/2002 | Stark | ......................... | B60R 7/04 224/563 |
| 7,309,102 B1 | 12/2007 | Davis | | |
| 7,614,689 B2 | 11/2009 | Fowler | | |
| 8,408,642 B1 * | 4/2013 | Reidy | ..................... | B60R 7/043 297/184.11 |
| 2013/0098960 A1 * | 4/2013 | Bowman | ................. | B60R 7/005 224/572 |
| 2013/0300160 A1 | 11/2013 | Cho | | |
| 2016/0096455 A1 * | 4/2016 | Zimmerman | .......... | B60R 7/005 297/463.1 |

* cited by examiner

*Primary Examiner* — Sarah B McPartlin (57) ABSTRACT

A seat cargo net specifically for use in a passenger seat of any vehicle with bucket seats to restrain movement of loose portable objects of various sizes, shapes, and heights placed on the passenger seat and prevent shifting or spilling of contents to the floor. The invention is fully adjustable and expandable; easy to use, requiring no assembly, no hardware, bolts, nuts or screws. It is neither tethered to nor integrated with the seat. By use of the net with the passenger seat, the driver has ready access to the secured items and can be worry-free the items will not shift, move, spill, or become projectile potentially resulting in personal injury in the event of a sudden stop, swerve or swift cornering while the vehicle is in motion.

8 Claims, 9 Drawing Sheets

PASSENGER SEAT CARGO NET

CROSS-REFERENCE TO RELATED APPLICATIONS

This application claims the benefit of priority to U.S. Provisional Patent Application Ser. No. 62/603,218 filed May 22, 2017, which is hereby incorporated herein by reference in its entirety for all purposes.

DESCRIPTION

Background of the Invention

1. Field of the Invention

This invention pertains to a device for restraining placement of objects/articles on a vehicle seat. Objects/articles placed in the passenger seat which may need to be accessed by the driver can create distractions when the vehicle is in motion and may lead to hazardous situations if unrestrained which could result in the items getting lodged under the brake or gas pedal, causing the driver to possibly lose control. More particularly, the invention relates to a seat cargo net which prevents shifting and spilling of contents from objects/articles placed on the vehicle seat, specifically the front passenger seat, reduces distracted driving in the event of a sudden stop or sharp cornering of the vehicle, and provides safe and easy access by the driver without awkwardly bending, twisting and stretching one's arm into an unnatural position to gain access to the objects/articles, if necessary, while the vehicle is in motion.

Ordinary loose objects in motor vehicles are estimated to be responsible for 13,000+ injuries per year, as reported by the NHTSA. At 55 miles per hour, many objects could be transformed into a projectile with potentially lethal power in a collision depending on the severity of the collision.

Drivers in motor vehicles often place loose objects such as briefcase, laptop, handbag/man bag, cellphone, phone charger, books, tissue box, water bottle, wallet, keys, lunch bag, gym bag, shoes, small suitcase, fast food items, utensils, cakes, floral arrangement, groceries and even garbage on the unoccupied passenger seat.

Loose objects/articles placed in the passenger seat may shift, move or spill out its contents while the vehicle is in motion. A restraining device such as the seat cargo net under which such objects/articles are placed and protected within the net keeps the items safely within reach and provides a cost-effective solution for greater security of those items in the event of sudden braking, swerving, swift cornering or a collision. Accommodations for a passenger to occupy the seat does not require the net to be removed or even collapsed depending on the shape of the seat. However, should the driver choose to adjust the net for a passenger to occupy the seat the only adjustment needed is to lower or collapse the seat cargo net to the crevice of the passenger seat until needed again for restraining objects/articles.

2. Description of the Related Art

The field of drawings disclosed herein pertains to organization inside of a vehicle, and particularly to a device for restraining a variety of loose portable objects/articles in the passenger seat of a motor vehicle.

In one attempt cited to address this issue, a non-expanding sling is configured as a cradle and attached to the console between the driver seat and passenger seat with hook attachments at both headrests to create the cradle for holding a handbag and other small items. However, there is no full restraint to prevent the handbag or small items from flying out of the cradle in the event of heavy braking or cornering which could result in the items getting lodged under the brake or gas pedal, causing the driver to possibly lose control. Further, the size of the cradle limits what can be placed in it. Additionally, the awkward twisting position of the driver's arm required to access the objects/articles placed in the cradle between the seats may prove to be an unsafe or even impossible angle or annoying to the driver and could result in a distracted driving situation or possible accident.

In another attempt cited to address this issue, hooks are attached to the headrests of both the driver seat and passenger seats with a pocket/bag hanging between the two seats. However, the size of the bag limits what can be placed in it and the top entry point constricts access to the items within the bag. Access to the objects/articles in the bag while the vehicle is in motion may be difficult for the driver as the bag appears to collapse to a closed position at the top entry point. As noted above, the awkward twisting position of the driver's arm required to access the objects/articles placed in the bag between the seats may prove to be an unsafe or even impossible angle or annoyance to the driver and could result in a distracted driving situation or possible accident.

In another attempt cited to address this issue, a hanging device containing multiple small compartments for organizing and storing loose portable items is attached to the top of the passenger seat. This compartmentalization restricts the sizes and shapes of objects/articles that can be placed in the hanging device. Accommodations for a passenger to occupy the seat would require full removal of the device.

Another attempt cited to address this issue, is a tethering system for holding items in the passenger seat. This device is a more permanent solution involving assembly, and nuts, bolts and screws. The tethering system is integrated into the side of the seat and in the hardware of the seat's construction. The configurable tether strap is integrated into the vehicle seat and uses D-rings to attach to existing attachment points on the constructed seat. Further, the inflexibility of this system makes restrictive in its use and is inconvenient for the user to disassemble for a passenger to occupy the seat.

BRIEF SUMMARY OF THE INVENTION

The present disclosure of the invention provides a device, a seat cargo net, for effectively and conveniently restraining a variety of objects/articles in a vehicle passenger seat. The device disclosed herein is not intended to be used as an occupant or pet restraint system but is instead intended to be used to restrain portable objects/articles from movement on or in a vehicle seat, such as but not limited to a laptop, briefcase, handbag/man bag, cellphone, phone charger, book, binder, tissue box, water bottle, wallet, lunch bag, gym bag, shoes, small suitcase, fast food items, utensils, cakes, floral arrangement, groceries and garbage like empty cans and food boxes. Neither is this invention a qualifiable safety precaution but is intended as a restraining device to reduce distractions of the driver of a vehicle and aid in securing loose objects that can become projectile while the vehicle is in motion.

The seat cargo net invention utilizes a durable premium quality nylon and elastic diamond mesh net. The top and bottom of the net is banded with nylon strapping. The nylon strapping also encases two elastic bungee nylon shock cords and includes an integrated grommet at the center of the top band only. One shock cord of thicker size is threaded around the entire perimeter of the net providing greatest expandability. The thicker size shock cord has an adjustable braided non-roll elastic strap attached at each of the four corners of the mesh net. Each elastic strap includes one male and one female end of an adjustable parachute buckle. The male and female ends are interlocked to complete the fastening of the seat cargo net at the backside of the seat. The combined length of the elastic straps is adjustable which extends the expandability and depth of the entire device making it adaptable to most vehicle passenger seats for accommodating objects/articles of various sizes and shapes.

A second shock cord of thinner size has an integrated plastic toggle double hole spring loaded cord lock. This thinner shock cord is functional for restraining taller objects/articles by looping the cord from the back of the passenger seat through the headrest posts of the passenger seat to the front of the passenger seat and fastening it through the grommet at the center of the top band of the net. The total height of the mesh net and the length of the thinner shock cord may be easily adjusted to accommodate various sizes or shapes of objects/articles of taller height. Use of the thinner shock cord is optional as the net can secure taller items on its own as well.

The seat cargo net disclosed aids in the restraint of objects/articles while the vehicle is in motion. Additionally, the seat cargo net is easily accessible from the passenger door when the vehicle is not in motion. The use of the seat cargo net is a stationary device as required and can quickly and easily be collapsed and partially concealed when not in use making it on-demand in nature. The device may require an accessible headrest post to utilize the smaller shock cord for restraining taller items and is also adaptive to a second or third row bucket seat that may or may not have headrest posts as the use of the thinner shock cord is optional and only on an as needed basis.

Other features and functionality of this invention will become apparent as explained below in the detailed description of the embodiment in conjunction with the accompanying drawings and claims and is not meant to be limiting in the scope of the invention.

BRIEF DESCRIPTION OF THE DRAWINGS

For a more complete understanding of this invention, reference should now be made to the embodiment illustrated in greater detail in the accompanying drawings and described below, wherein.

Other objects and advantages of the invention may be noted as the description proceeds.

DETAILED DESCRIPTION OF THE ILLUSTRATED EMBODIMENT

It is a published statistic that unsecured loose objects in a vehicle are one of the top causes of vehicle accidents as they can be distracting as they slide around or fall to the floor when the driver brakes suddenly, swerves or turns a corner. In addition, these items can become projectile during a heavy impact and may cause serious personal injury and even death to the driver or passengers.

The present invention relates to a device that serves to restrict movement of a variety of loose portable objects/articles of varying sizes (small to large) and heights that may be placed in/on a bucket-style passenger seat or in/on a second or third row bucket seat of a motor vehicle. Said invention will prevent shifting and projectile forward, sideward and backward movement of any items placed in or on the seat while the vehicle is in motion preventing hazardous situations which may lead to accidents or personal injury. Additionally, the structure, flexibility and expandability of the device allows for easy visibility, and safe and easy access of the object/article and its contents therein by the driver, if needed, without the driver uncomfortably twisting their arm into an awkward and dangerous position while the vehicle is in motion and while the vehicle is stationary.

The present invention can pertain to placement of objects/articles inside any motor vehicle with bucket seats to restrain movement of such loose items as small as a set of keys or cell phone to as large and wide as a stack of pizza boxes or grocery bags to as tall as a potted floral arrangement or as heavy as a watermelon and everything in between.

The present invention is quickly and easily collapsible while still assembled (does not have to be unbuckled and re-buckled) when not in use and the seat needs to be available for passenger occupancy. If needed, accommodations for a passenger to occupy the seat requires only the adjustment to lower the seat cargo net to the crevice of the upright passenger seat until needed again for restraining objects/articles.

In the following description, the same numeral references as above will be made to the same components. Specific parameters and components included are examples and are not intended to be limiting in operation or use.

The seat cargo net is constructed of high quality, durable nylon and elastic mesh netting encased on all four sides by elastic bungee shock cord and wraps around the bucket seat with triple reinforced elastic strapping secured at its top band and at its bottom band to attach behind the seat by sturdy side-release durable plastic adjustable parachute buckles which avoid accidental release. A second and thinner elastic bungee shock cord equipped with a spring-loaded double barrel cord lock is threaded through the top band of the netting to wrap from the top back of the seat and passed between the headrest posts to the front of the net where it attaches to the top band of the net via a grommet integrated in the top band and locks in place.

Figure 1:
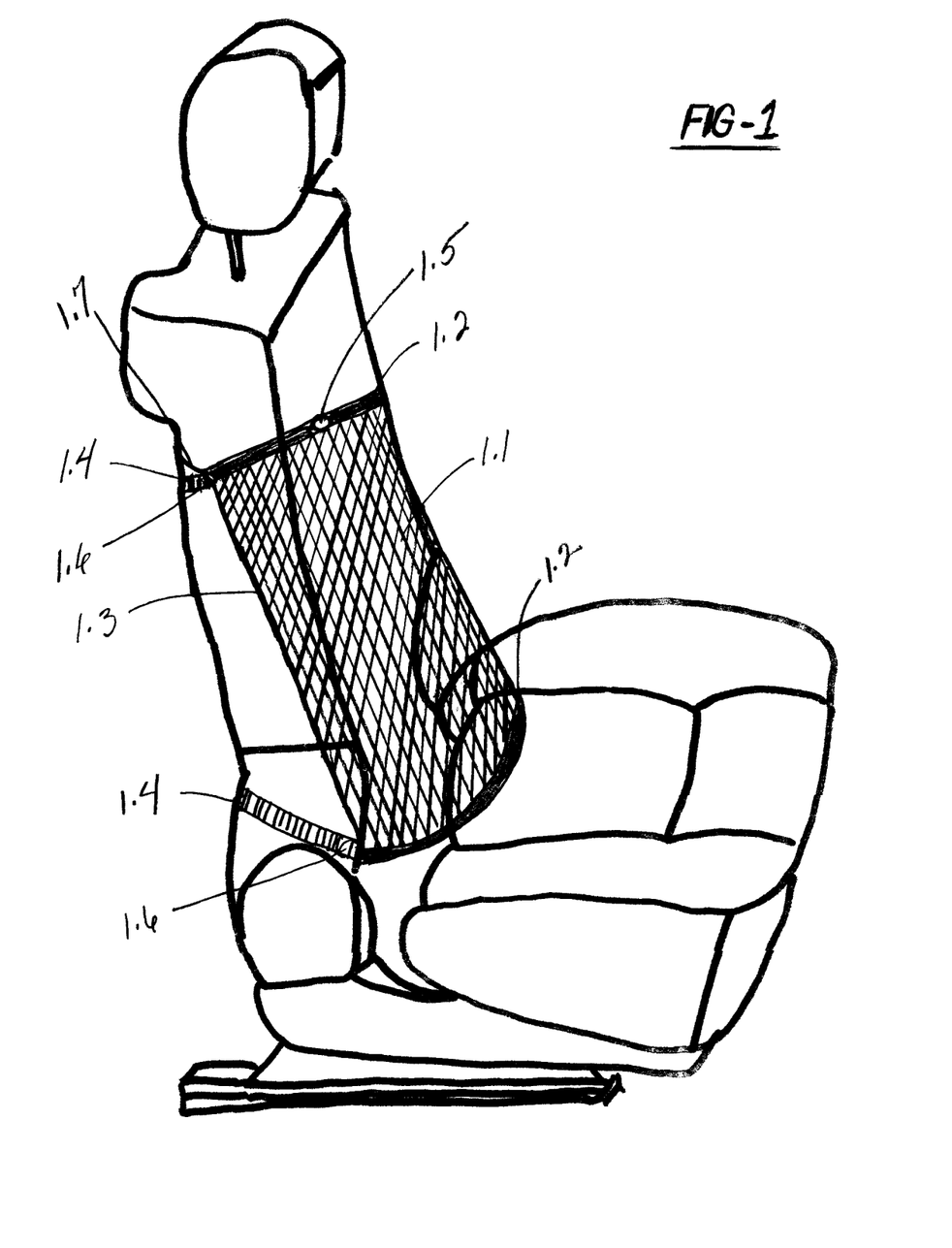
FIG. 1 depicts a diagram of a front side view of the device installed in the passenger seat of the motor vehicle adjusted at full height.

FIG. 1, an upright bucket seat, typically for use as a passenger seat, an exemplary embodiment of the device, a square nylon mesh net 1.1 measuring 27"×29.5" with 1" diamond-shaped mesh has a doubled 1" reinforced nylon band 1.2 finishing and stitched to the top and bottom of the net. Varying sizes (large vs small) may be provided for different vehicle seat sizes to ensure optimum fit, expandability and security. The reinforced nylon top band 1.2 includes an integrated ½" black finished grommet 1.5. A 3/16" elastic bungee shock cord 1.3 is integrated around all four sides of the net in the reinforced nylon band at the top and bottom respective sides of the net and threads through each diamond of the mesh 1.1 at its right and left respective sides. The first pair of non-roll elastic straps 1.4 are attached and triple reinforce stitched for strength to the elastic bungee shock cord 1.3 at the right and left respective corners 1.6 at the top and bottom nylon band 1.2 of the mesh net 1.1. A 1/8" elastic bungee shock cord 1.7 measuring 54" in length is integrated in the nylon top band 1.2 for use with securing taller items placed in the front seat. (refer to FIG. 3)

Figure 2:
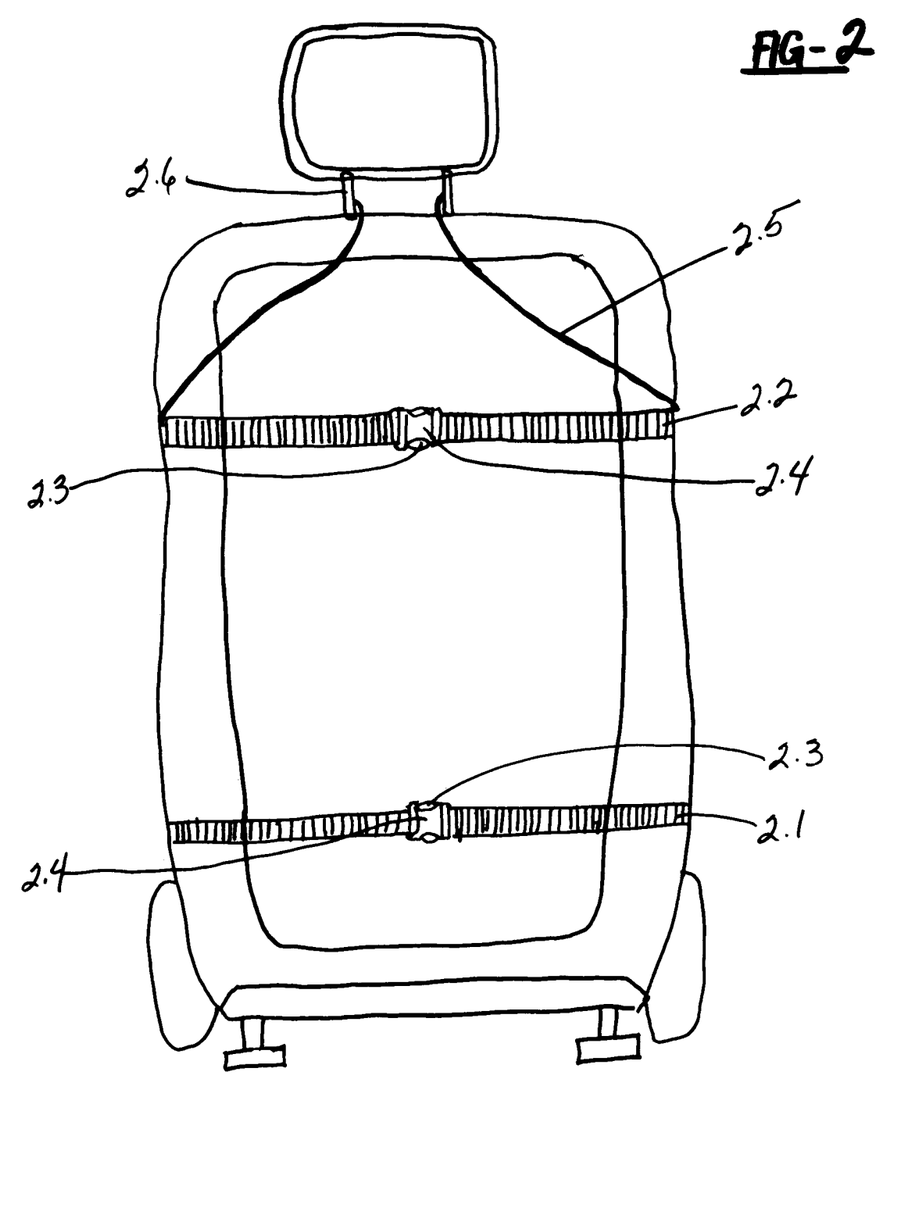
FIG. 2 depicts a full rear view of the device buckled by the quick release adjustable parachute buckles at the back of the passenger seat of the motor vehicle adjusted at full height with the thinner shock cord pulling through the headrest posts to be locked in place within an integrated grommet at the top band of the device at the front of the seat.

As shown in FIG. 2, a view of the device from the upright back of the bucket seat, the triple reinforced non-roll elastic straps wrap around to the upright seatback at the lowest portion of the seatback 2.1 and separately at the driver's preferred higher portion of the seatback 2.2 respectively. The left end of each elastic strap at the lower and higher portion of the seatback terminates in the adjustable male portion of the side-release parachute buckle 2.3. The finished edge of the elastic strap in the male portion is double rolled and triple reinforce stitched for strength and to prevent detachment or pull-out from the buckle while adjusted to its maximum length. The adjustable buckle allows for differing expansion depths to appropriately accommodate securing objects/articles at the front of the seat. The right end of each elastic strap terminates in the adjustable female portion of the side-release parachute buckle 2.4. The finished edge of the elastic strap in the adjustable female portion is triple reinforce stitched for greater strength and holding power. The second thinner elastic bungee shock cord 2.5 is utilized when passed between the headrest posts 2.6 to connect at the top front of the net. (refer to FIG. 3)

Figure 3:
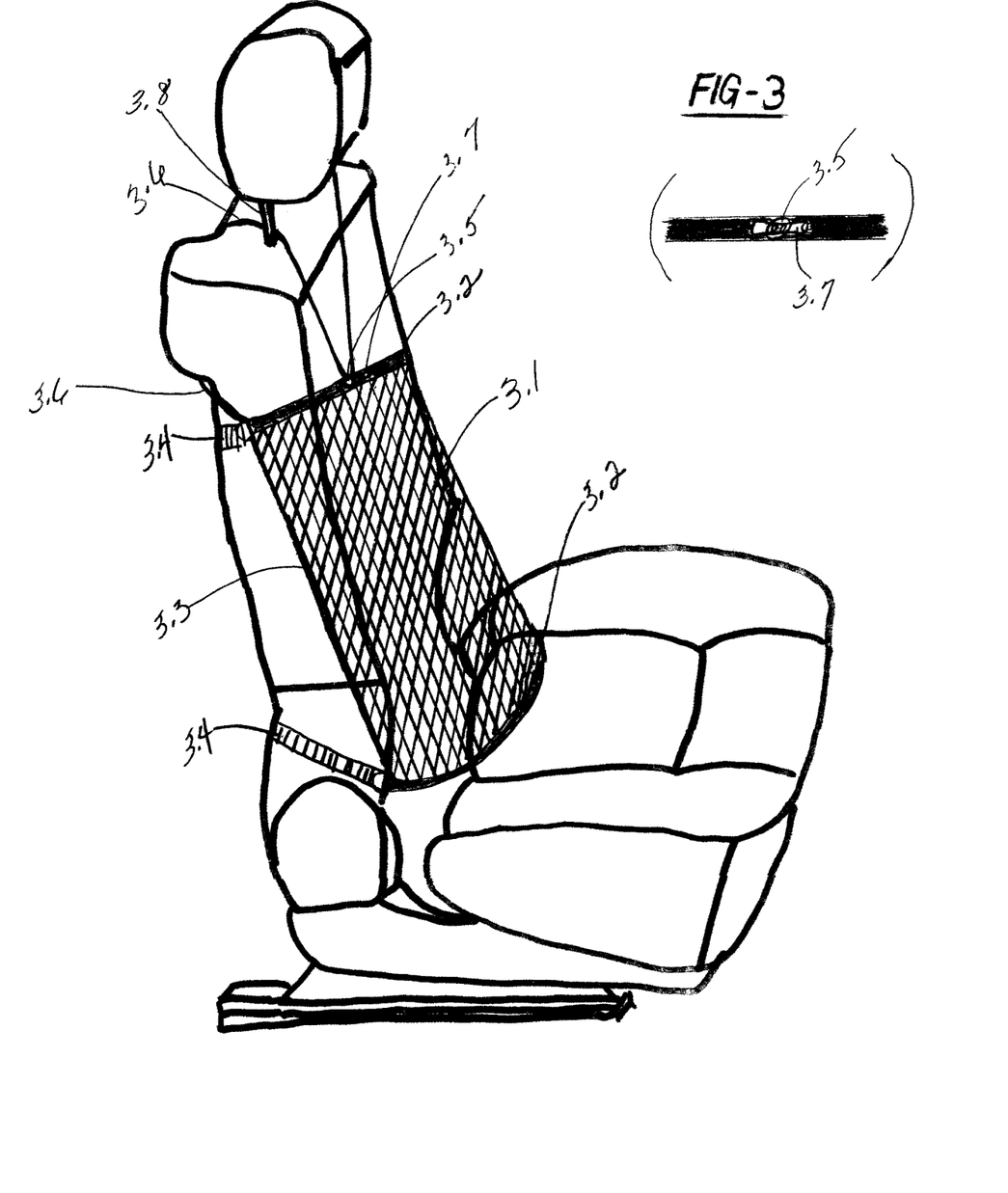
FIG. 3 depicts a front side view of the device installed in the passenger seat of the motor vehicle adjusted at full height with the thinner shock cord locked in place within an integrated grommet at the top band of the device. Also depicted is an exploded view of the cord lock locked in place at the grommet hole.

FIG. 3, a spring-loaded double barrel cord lock 3.7 is integrated with the thinner shock cord 3.6. When the shock cord 3.6 is passed between the headrest posts 3.8 from the backside of the seat to the frontside of the seat, the cord lock 3.7 pushes through the grommet hole 3.5 and can slide to any adjusted position and lock in place to secure taller objects/articles. (See exploded view of cord lock 3.7 locked in place at the grommet hole 3.5.)

Figure 4:
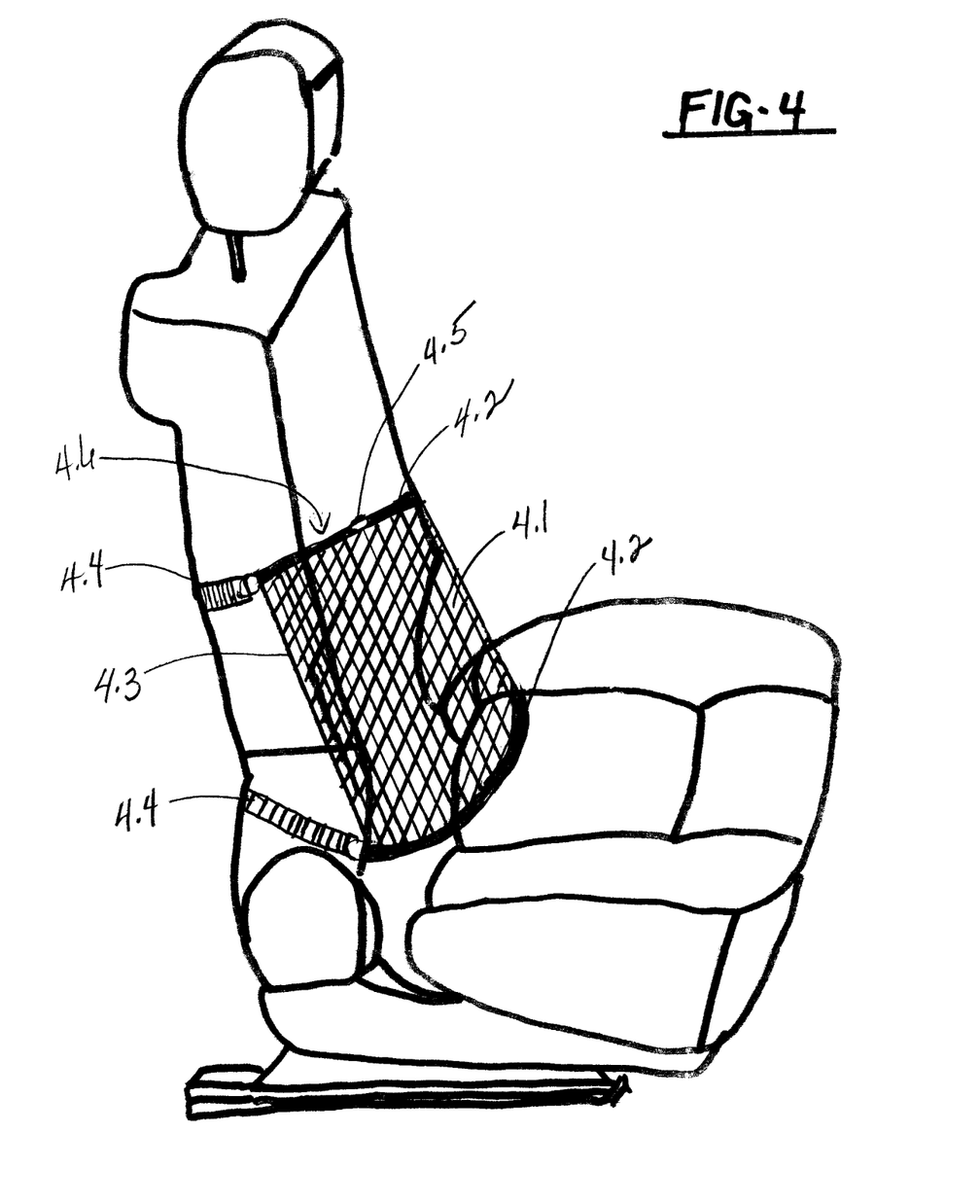
FIG. 4 depicts a front side view of the device installed in the passenger seat of the motor vehicle adjusted at mid height as to allow safe and easy accessibility to any objects/articles placed in the seat by the driver of the motor vehicle according to at least one aspect of the present disclosure.

FIG. 4, an exemplary aspect, depicts the seat cargo net adjusted at mid-height on the upright seat. Such adjustment may make it more convenient for smaller secured items and/or their contents placed on the seat to be easily accessible and within safe reach of the driver, via the top entry of the net 4.6, yet still fully restrained from shifting or movement while the vehicle is in motion.

Figure 5:
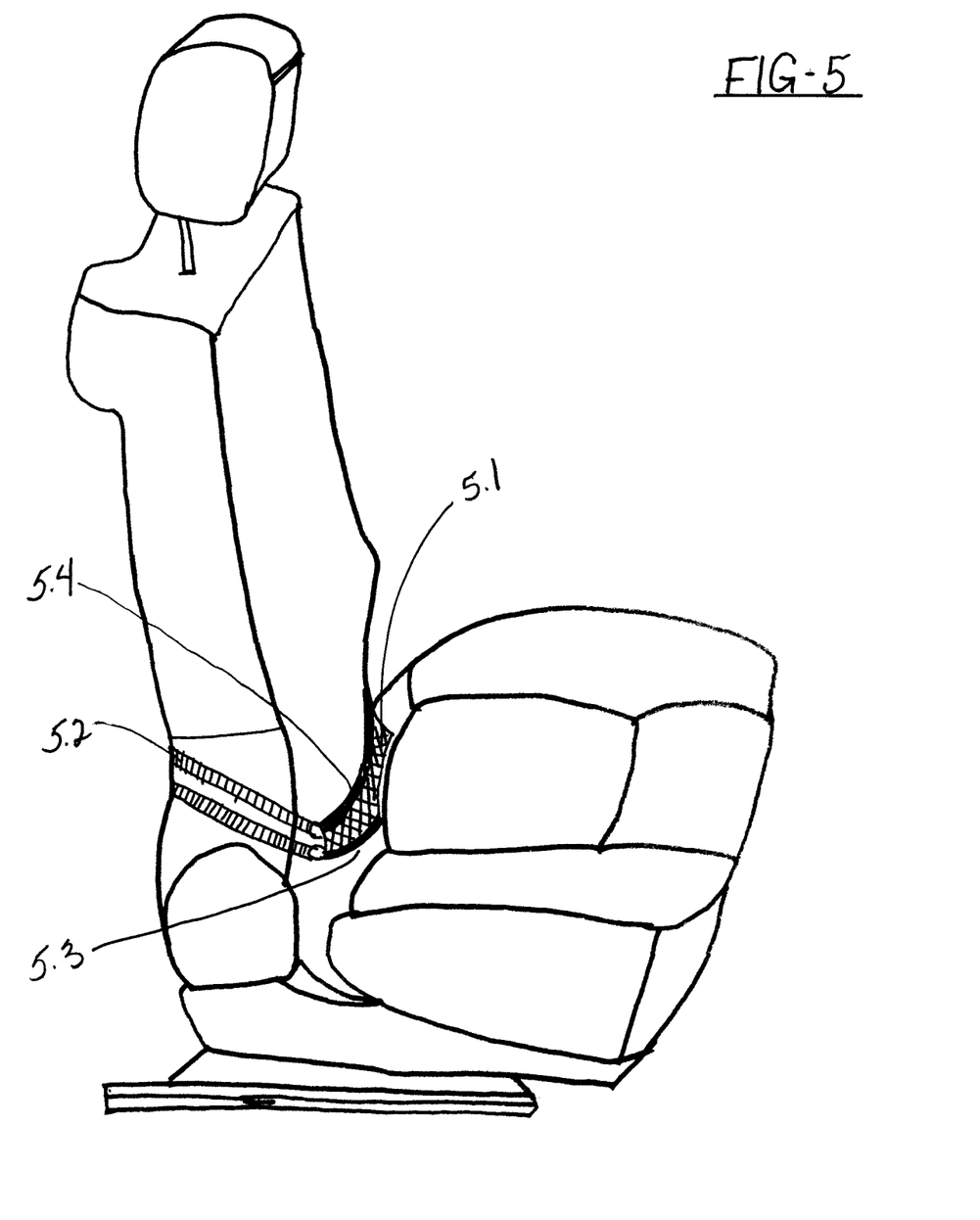
FIG. 5 depicts a front side view of the device fully collapsed to the crevice of the passenger seat as to be conveniently stowed fully installed to allow for occupancy of the passenger seat, if needed, in the motor vehicle according to at least one aspect of the present disclosure.

FIG. 5, an exemplary aspect, depicts the seat cargo net fully collapsed 5.1 in the crevice of the seat 5.3 without being intrusive on the upright portion of the seat nor on the seat itself allowing the seat to be occupied by a passenger with no impact to their comfort or safety.

In reference to FIG. 5, the seat cargo net does not require unbuckling or removal from the seat in order to accommodate an occupant in the seat. It is readily accessible to be quickly re-adjusted by pulling up on the top straps 5.2 and top band 5.4 for restraining objects/articles again once passenger occupancy is no longer required.

Figure 6:
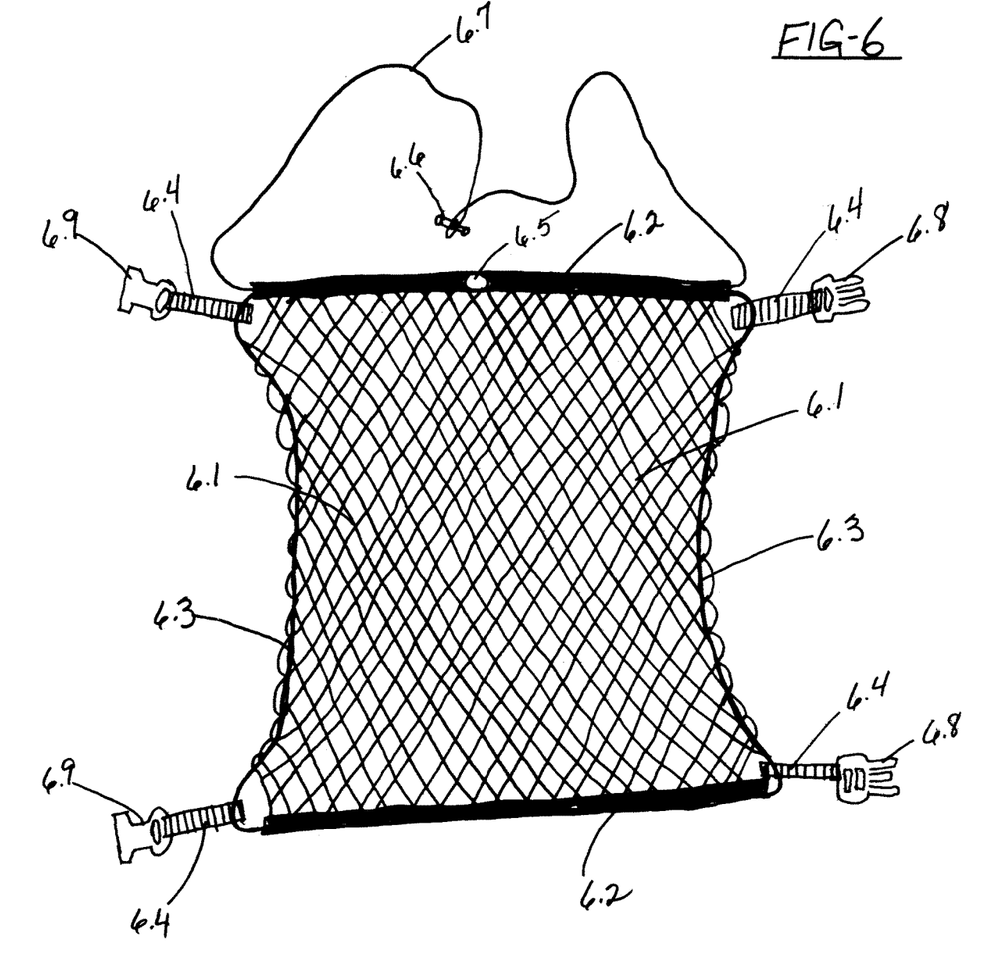
FIG. 6 depicts a full view of the device and all related elements unattached to the passenger seat prior to installation.

FIG. 6, illustrates the invention, the seat cargo net, in its entirety unattached and uninstalled.

Referring to FIG. 6, each element of the seat cargo net is identified as follows.

1" diamond mesh net 6.1.
1" reinforced nylon band 6.2
3/16" elastic bungee shock cord 6.3
1" non-roll elastic straps 6.4
½" black finished grommet 6.5
Spring-loaded double barrel cord lock 6.6
1/8" elastic bungee shock cord 6.7
Male portion parachute buckle 6.8
Female portion parachute buckle 6.9

A variety of objects/articles may be restrained by the seat cargo net invention as shown in FIGS. 7 through 10. The illustrated articles are exemplary only. Other items of varying size or height may be used in lieu of or in addition to those illustrated.

Figure 7:
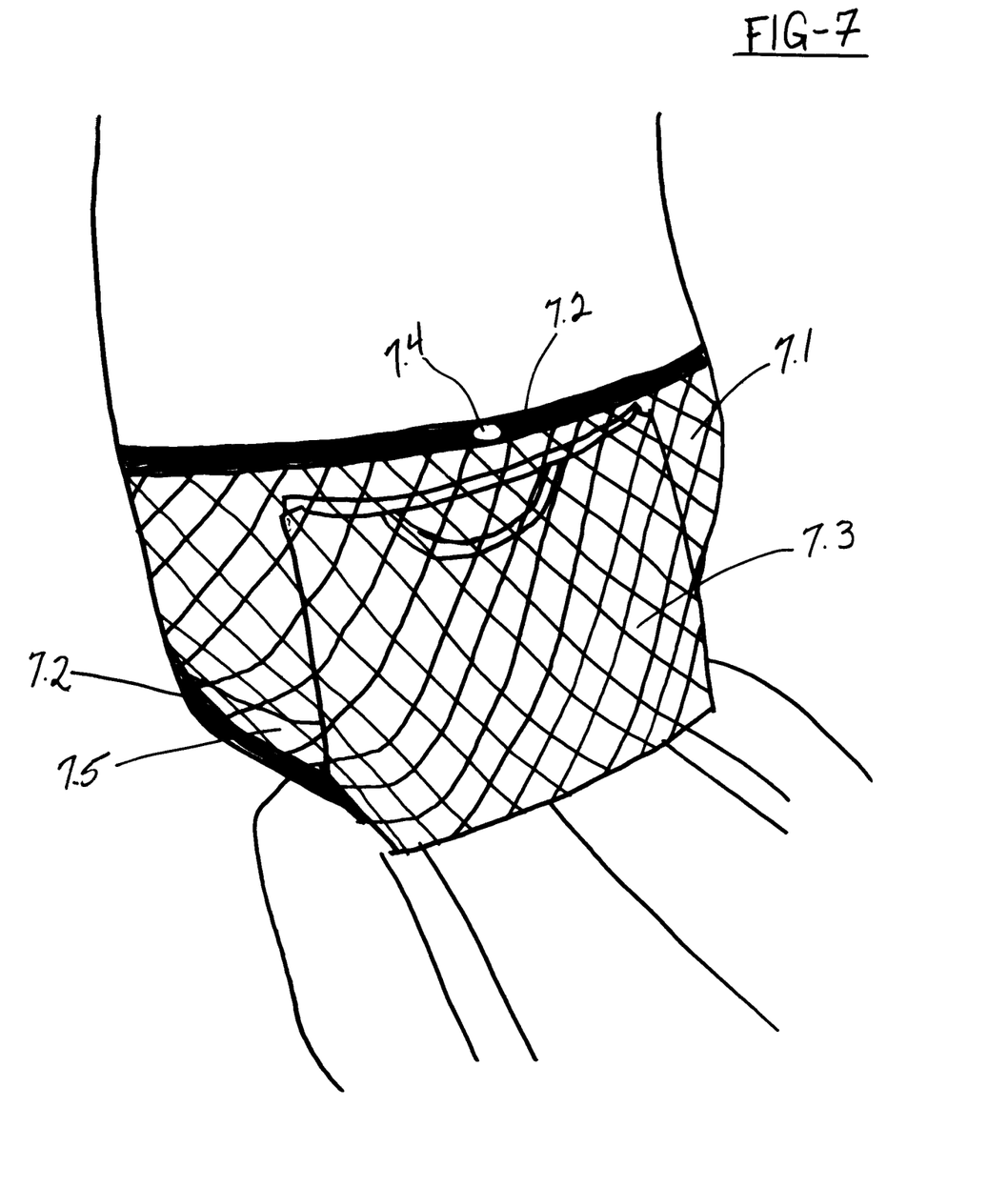
FIG. 7 depicts a front view of the device at mid height restraining an item, in this case a briefcase, with its contents easily accessible to the driver according to at least one aspect of the present disclosure. Also illustrated is the natural pouch/pocket that the net creates once an item is placed within it.

FIG. 7, a cutaway and an exemplary aspect, illustrates the seat cargo net 7.1 accommodating a briefcase 7.3, according to at least one aspect of the present disclosure. The drawing illustrates the flexibility and expandability of the device as well as the pocket or pouch 7.5 that the seat cargo net naturally creates underneath any object/article placed within the net, cradling the item secured by the net and providing more restraint from shifting, movement or spilling of contents while the car is in motion.

Figure 8:
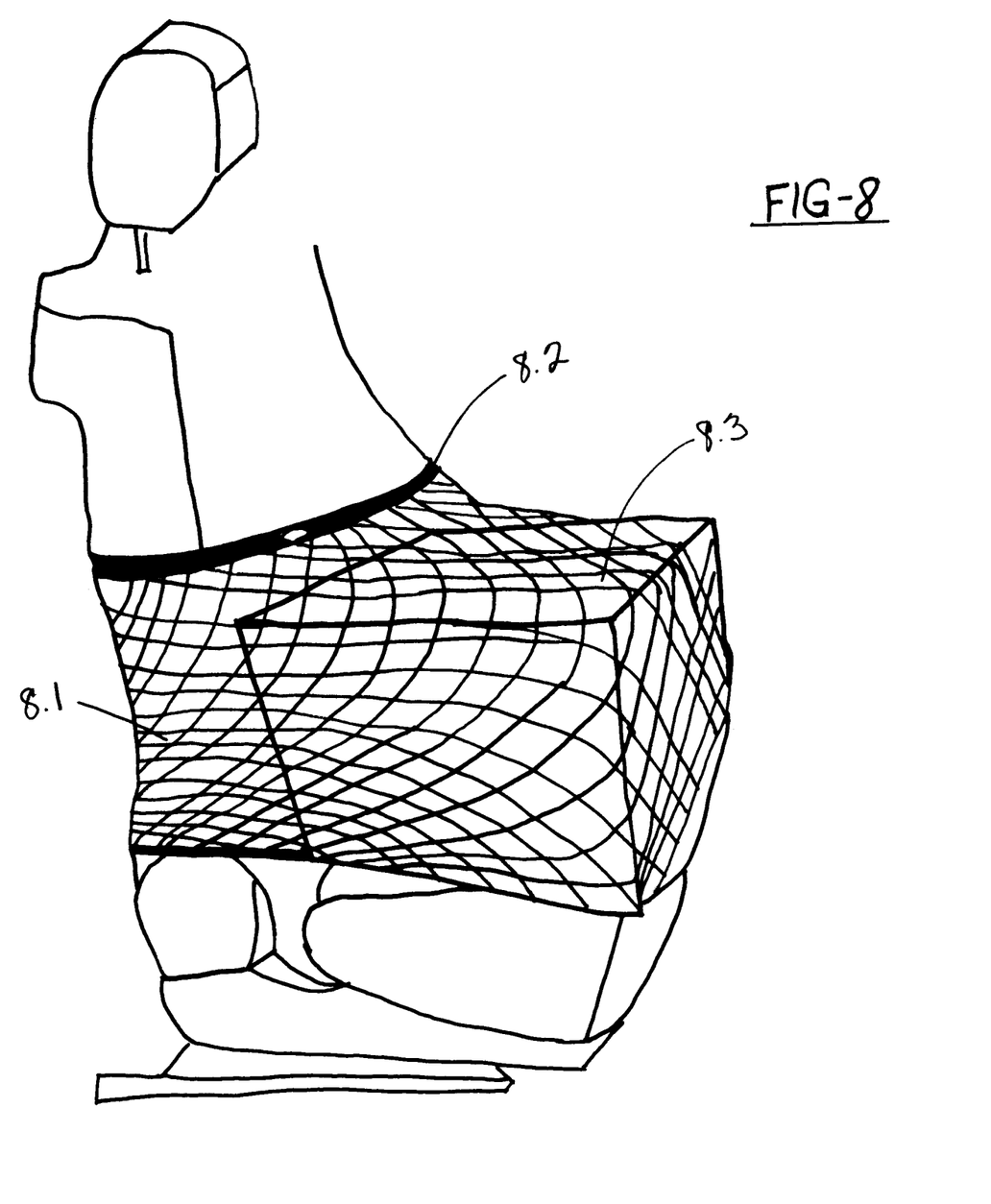
FIG. 8 depicts a side view of the device accommodating a large item, in this case a box/package, according to at least one aspect of the present disclosure.

FIG. 8, a cutaway and an exemplary aspect, further illustrates the flexibility and expandability of the seat cargo net as accommodating a large rectangular box 8.3 which fills 98% of the seat itself and cradles the item securely preventing shifting or movement while the car is in motion. The drawing also illustrates the flexibility and expandability of the device as well as the pouch/pocket that the seat cargo net naturally creates underneath any object/article placed within the net, cradling the item secured by the net and providing more restraint from shifting or movement while the car is in motion.

Figure 9:
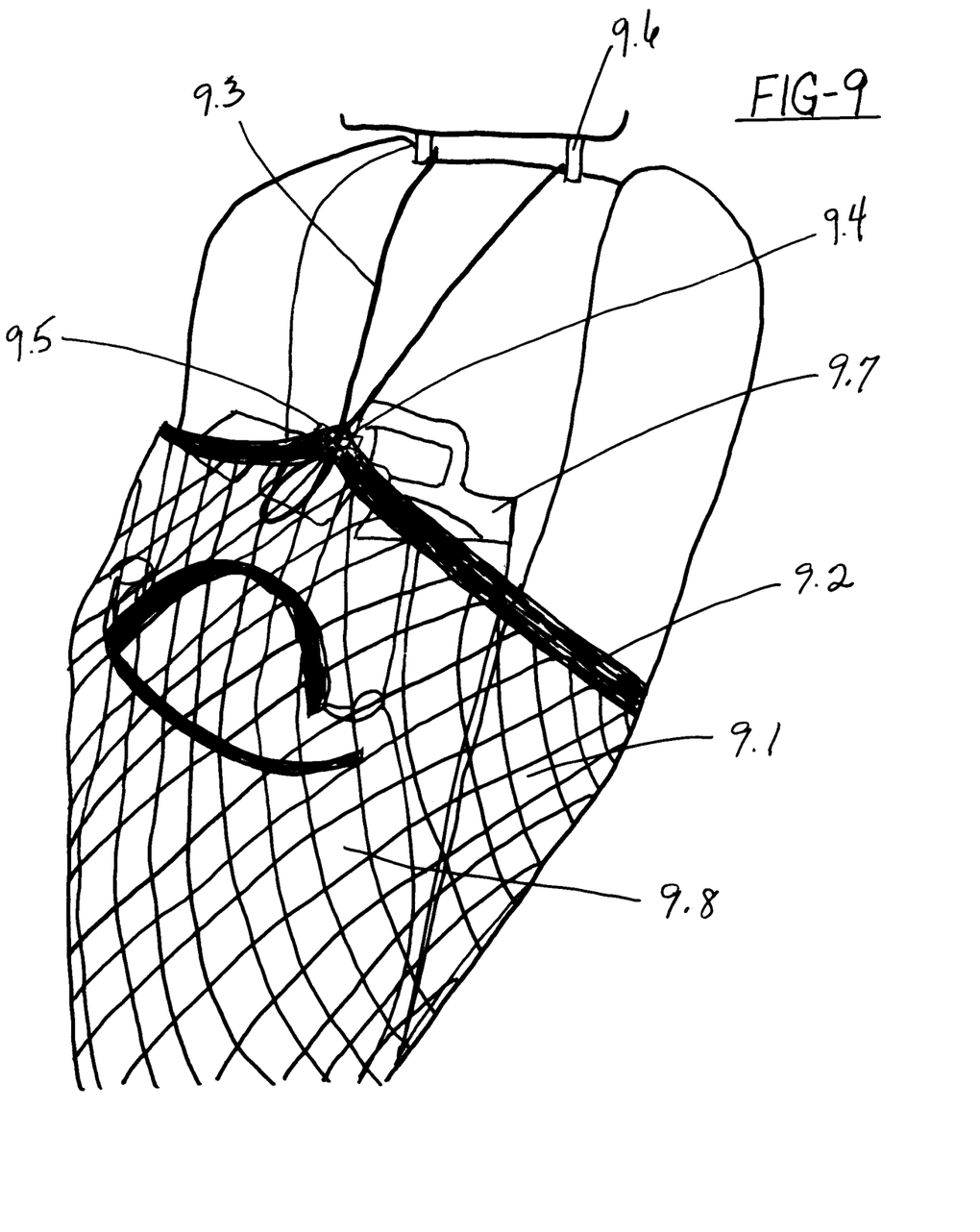
FIG. 9 depicts a front side view of the device accommodating multiple items, in this case a tall bag of groceries and a handbag, according to at least one aspect of the present disclosure.

FIG. 9, a cutaway and an exemplary aspect, illustrates the seat cargo net 9.1 adjusted at a higher height, according to at least one aspect of the present disclosure, utilizing the thinner elastic shock cord 9.3 pulled from the backside of the seat between the headrest posts 9.6 and interlocked in the grommet 9.4 by the spring-loaded double barrel cord lock 9.5 providing restraint for multiple items, in this case a tall grocery bag 9.7, along with a handbag 9.8. The drawing illustrates the adjustability of the seat cargo net to various heights and demonstrates the effectiveness of the thinner shock cord 9.3 drawn tightly and locked in the grommet 9.4 by the cord lock 9.5 providing greater security to prevent items from shifting or moving, and their contents from spilling out, while the car is in motion.

Although not all inclusive, below is a summary list of some benefits that can be associated with use of the invention:

1. Affords safe and quick access to otherwise loose objects/articles placed in the passenger seat for the driver of a vehicle.
2. Ideal for those who work out of their car and need quick access to books, briefcases, binders or business materials.
3. Ideal for owners of two-seater vehicles with limited trunk space providing effective restraint for some objects/articles that could typically be placed in a trunk.
4. Reduces distracted driving by preventing loose objects/articles from moving which may cause the driver to take their eyes off the road as items shift.
5. Reduces distracted driving by providing easy access to the objects/articles and their contents from the top of the net.
6. Keeps unsecured or loose objects/articles off the floor, and safely within reach by the driver while the vehicle is in motion.
7. Reduces distracted driving that could result from the driver reaching to the front passenger floor, the backseat or the backseat floor while the vehicle is in motion.
8. Offers easy access to objects/articles restrained by the net from the passenger side door.
9. Accommodates most vehicles with an upright bucket passenger seat or second or third row bucket seat where the back of the seat is easily accessible so the device can be properly and quickly installed.
10. Allows for optional use of the thinner shock cord on an as needed basis only.
11. Keeps unsecured or loose objects/articles from shifting and moving to the floor, or contents spilling to the floor which may cause distracted driving and reducing the possibility of a hazardous or potentially lethal situation resulting from the objects/articles becoming stuck under the brake pedal or the gas pedal.
12. Keeps unsecured or loose objects/articles from shifting and moving eliminating a possible hazardous situation where the items could become projectile in a collision.

In summary, as required, detailed embodiments of the present invention are disclosed herein. The invention provides a practical, cost-effective, and extremely convenient way to secure objects/articles in a motor vehicle passenger seat that might otherwise be left loose in the vehicle for access by the driver which could become hazardous while the vehicle is in motion.

Any technical and scientific terms used herein have the same meaning as commonly understood by any person skilled in the art or science to which the invention pertains. Although a variety of alternative methods and materials to those described herein can be used in the practice of the present invention, the preferred materials and methods are described herein.

As may be appreciated by any person skilled in the art or science, the methods and compositions of this invention substantially improve the structural and functional limitations associated with prior art methods and compositions.

While the invention has been described in one or more embodiments, it is to be understood that the specific mechanisms and techniques which have been described are merely illustrative of the principles of the invention. Modifications may be made to the methods and compositions described without limiting the spirit and scope of the invention as defined by the enclosed claims.

Accordingly, it will be understood by any person skilled in the art or science that the claims are intended to cover all such modifications and embodiments, which are within the spirit and scope of the present invention.

What is claimed is:

1. An apparatus for preventing movement of articles in a seat, comprising:
   a net, the net having an outer elastic cord;
   at least two attachment straps attaching to the outer elastic cord;
   at least one of the attachment straps having a female buckle mechanism;
   at least one of the attachment straps having a male buckle mechanism;
   the net having a hollow tubular outer portion, the outer elastic cord extending through the hollow tubular outer portion.

2. The apparatus for preventing movement of articles in a seat of claim 1, wherein at least one of the attachment straps is a first upper attachment strap attaching to an upper male buckle mechanism, at least one of the attachment straps is a second upper attachment strap attaching to an upper female buckle mechanism, at least one of the attachment straps is a first lower attachment strap attaching to a lower male buckle mechanism, and at least one of the attachment straps is a second lower attachment strap attaching to a lower female buckle mechanism.

3. The apparatus for preventing movement of articles in a seat of claim 2, wherein the first upper attachment strap is a first upper adjustable attachment strap, the second upper attachment strap is a second upper adjustable attachment strap, the first lower attachment strap is a first lower adjustable attachment strap, and the second lower attachment strap is a second lower adjustable attachment strap.

4. An apparatus for preventing movement of articles in a seat, comprising: a net, the net having a hollow tubular outer portion and an outer elastic cord extending through the hollow tubular outer portion; a second elastic cord extending through the hollow tubular outer portion, the second elastic cord adapted to one of stretch over at least one of a headrest and an upper portion of the seat, and stretch between at least one of a headrest and an upper portion of the seat; at least two attachment traps attaching to the outer elastic cord; at least one of the attachment straps having a female buckle mechanism; at least one of the attachment traps having a male buckle mechanism.

5. The apparatus for preventing movement of articles in a seat of claim 4, the second elastic cord extending through a grommet of the hollow tubular outer portion and a cord lock, the cinch the second elastic cord.

6. The apparatus for preventing movement of articles in a seat of claim 5, the cord lock being a spring-loaded double barrel cord lock.

7. The apparatus for preventing movement of articles in a seat of claim 5, wherein at least one of the attachment straps is a first upper attachment strap having an upper male buckle mechanism, at least one of the attachment straps is a second upper attachment strap having an upper female buckle mechanism, at least one of the attachment straps is a first lower attachment strap having a lower male buckle mechanism, and at least one of the attachment straps is a second lower attachment strap having a lower female buckle mechanism.

8. The apparatus for preventing movement of articles in a seat of claim 7, wherein the first upper attachment strap is a first upper adjustable strap, the second upper attachment strap is a second upper adjustable strap, the first lower attachment strap is a first lower adjustable strap, and the second lower attachment strap is a second lower adjustable attachment strap.

* * * * *